(12) United States Patent
Gratzer

(10) Patent No.: US 7,287,635 B2
(45) Date of Patent: Oct. 30, 2007

(54) FORCE -TRANSMISSION UNIT COMPRISING SPEED -DEPENDENT HYDRAULIC CLUTCH AND CENTRIFUGAL FORCE COMPENSATION

(75) Inventor: Franz Gratzer, Stallhofen (AT)

(73) Assignee: Steyr-Daimler-Puch Fahrzeugtechnik AG & Co KG, Graz (AT)

( * ) Notice: Subject to any disclaimer, the term of this patent is extended or adjusted under 35 U.S.C. 154(b) by 308 days.

(21) Appl. No.: 10/149,078

(22) PCT Filed: Dec. 7, 2000

(86) PCT No.: PCT/AT00/00331

§ 371 (c)(1),
(2), (4) Date: Jan. 14, 2004

(87) PCT Pub. No.: WO01/42675

PCT Pub. Date: Jun. 14, 2001

(65) Prior Publication Data

US 2006/0175173 A1    Aug. 10, 2006

(51) Int. Cl.
F16D 43/10 (2006.01)
(52) U.S. Cl. .................... 192/106 F; 192/35
(58) Field of Classification Search ............ None
See application file for complete search history.

(56) References Cited

U.S. PATENT DOCUMENTS

| | | | | |
|---|---|---|---|---|
| 2,446,088 A | * | 7/1948 | Hobbs | 74/359 |
| 2,966,978 A | * | 1/1961 | Kaptur | 192/106 R |
| 3,199,648 A | * | 8/1965 | Schwab | 192/87.17 |
| 4,733,635 A | | 3/1988 | Menard et al. | |
| 4,834,229 A | * | 5/1989 | Kanazawa | 192/85 AA |
| 5,310,388 A | | 5/1994 | Okcuoglu et al. | |
| 6,041,903 A | * | 3/2000 | Burns et al. | 192/85 AA |
| 6,675,944 B2 | * | 1/2004 | Lee | 192/106 F |

FOREIGN PATENT DOCUMENTS

| | | |
|---|---|---|
| EP | 0443149 | 8/1991 |
| FR | 2760058 | 8/1998 |

* cited by examiner

Primary Examiner—Saul Rodriguez
(74) Attorney, Agent, or Firm—Harness, Dickey & Pierce, P.L.C.

(57) ABSTRACT

A power transmission unit with a hydraulic coupling dependent on a rotational-speed difference, in which, when a rotationalspeed difference occurs between the input member (1) and the output member (6), a hydrostatic displacement machine (20) produces in a pressure space (34) a pressure that acts on a piston (27) acting on a friction clutch (31), has a housing (4). To compensate for the centrifugal force acting on the working fluid in the pressure space (34), at least one centrifugalforce element (11, 12, 13) is provided in the housing, exerting on the piston (27) a force counter to the pressure produced by the centrifugal force in the pressure chamber (34).

31 Claims, 2 Drawing Sheets

FORCE-TRANSMISSION UNIT COMPRISING SPEED-DEPENDENT HYDRAULIC CLUTCH AND CENTRIFUGAL FORCE COMPENSATION

BACKGROUND OF THE INVENTION

The invention relates to a power transmission unit with an input member and an output member and a hydraulic coupling dependent on a rotational-speed difference, in which, when a rotational-speed difference occurs between the input member and the output member, a hydrostatic displacement machine produces in a pressure space a pressure that acts on a piston acting on a friction clutch, the friction clutch having first and second disks connected in terms of drive to the input member and the output member respectively, and one of the members forming a housing that contains the displacement machine.

Power transmission units of this kind are used especially in drive trains of motor vehicles, preferably all-wheel-drive vehicles; either together with a differential, the hydraulic coupling limiting the differential action, or to drive the second driven axle, the torque transmitted depending on the difference between the wheel speed and the drive shaft connected to the wheels of the other axle. The pressure produced by the displacement machine acts on a clutch, preferably a multi-plate clutch. This action can be influenced by means of various valves, whether these are automatically acting valves or valves actuated by an external control system.

U.S. Pat. No. 5,536,215 has disclosed a power transmission unit of this kind, as has Austrian Utility Model 2964. In these and all such power transmission units, the pressure space in which the pressure acting on the piston is built up is in the rotating housing. As a result, the operating fluid contained in this housing is subject to a centrifugal force, which increases and thus distorts the pressure prevailing in the pressure chamber as a function of the rotational speed. This is particularly disruptive if the pressure is dependent on a rotational-speed difference and is supplied by a hydrostatic displacement machine, and this applies in both possible cases: if, in the first case—that of an unregulated coupling—there are no control valves, compensation is impossible; and if, in the second case, control valves intended to depressurize the pressure space for disengagement are provided, this is not possible at higher absolute rotational speeds because the discharge line adjoining the control valve has to end in a smaller radius. However, the pressure there is always less than in the pressure chamber, owing to centrifugal force.

It is therefore the object of the invention to eliminate these disadvantages corresponding to the special features of couplings of the generic type. The influence of centrifugal force should be at least partially compensated for to a necessary extent.

SUMMARY OF THE INVENTION

According to the invention, at least one centrifugal-force element is provided for this purpose in the housing, exerting on the piston a force that is the square of the rotational speed and acts counter to the pressure acting on the piston. By virtue of the fact that it is likewise situated in the housing, compensation to a specifiable extent is possible in all rotational-speed ranges without any outlay on regulation systems, given appropriate design. It is thereby possible to establish a speed dependence of the transmitted torque corresponding to the requirements as regards driving dynamics. The extent of compensation ranges from partial compensation and full compensation to overcompensation. In this arrangement, the transmitted torque falls as the speed increases, giving better traction at low speed and improved interaction with electronic brake systems (e.g. ABS) at high speed.

In an advantageous design, the at least one centrifugal-force element is a flyweight. Compensation of centrifugal force is thus performed in a purely mechanical way, and, in a preferred embodiment, the centrifugal-force element is part of a two-armed lever, one leg of which is the flyweight and the other lever of which is a pressure finger. The levers, of which there are three for example, are very simple and can be accommodated in the housing with only slight design changes. This is the simplest solution and can even be retrofitted to existing couplings.

The other design comprises the centrifugal-force element being an annular space that contains an operating fluid and rotates with the housing. This is a hydraulic method of compensating for centrifugal force. Since there is sufficient operating fluid in and around the coupling, there is no problem with supplying it.

In a first advantageous embodiment of this other design, the rotating annular space is formed by a cylindrical sleeve surrounding the housing and having a wall in the form of a circular ring normal to the axis and by a wall, normal to the axis, of the housing, and the sleeve is connected to the piston and can be displaced in an axial direction.

In this way, the annular space is bounded on one side by a displaceable wall and on the other side by a nondisplaceable wall of the housing. The liquid level in the annular space is determined by the inner radius of the wall in the form of a circular ring normal to the axis. The centrifugal force acting on the working medium in the annular space pushes apart the walls normal to the axis. This compensating force is transmitted to the piston by the displaceable sleeve.

In a second advantageous embodiment of this other design, the radially outermost zone of the rotating annular space is connected via a passage to a compensation pressure space on the opposite side of the piston from the pressure space. The annular space and the passage can also be provided within the housing. It is even possible, by means of valves associated with the passage, to achieve special effects in terms of driving dynamics.

A particularly elegant solution is for the compensation pressure space to be formed by an annular cylinder in the housing and by an annular continuation on the opposite side of the piston from the pressure space.

BRIEF DESCRIPTION OF THE DRAWINGS

The invention is described and explained below with reference to figures, in which.

DETAILED DESCRIPTION

Figure 1:
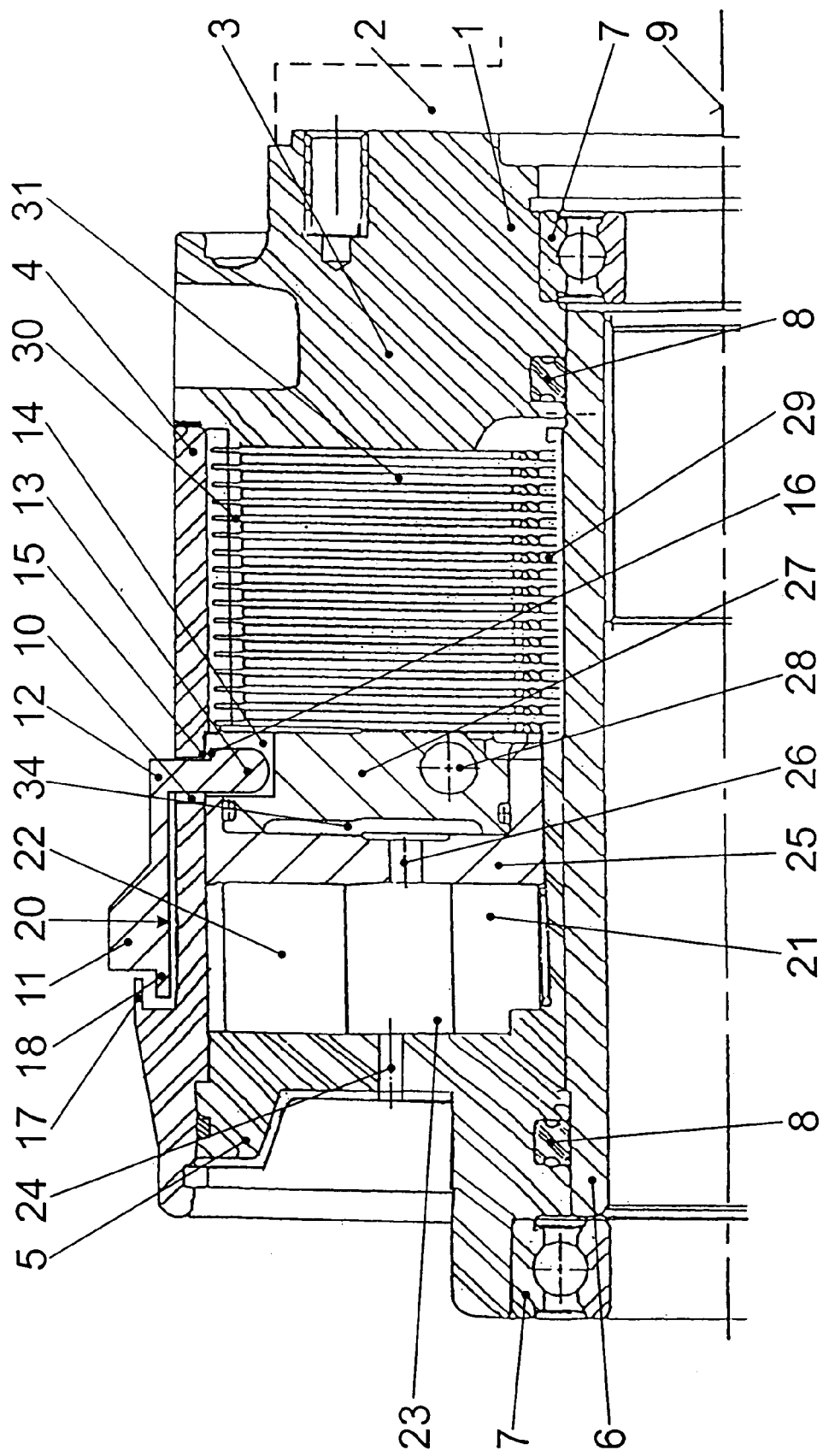
FIG. 1 shows a longitudinal section through a device according to the invention in a first embodiment.

In FIG. 1, the input member is denoted by 1 but it could also be the output member, to which a shaft 2, indicated in broken lines, is flanged by means of bolts, which are merely indicated. It comprises a front plate 3, an essentially cylindrical housing 4, which is connected integrally or in a fixed manner to the front plate 3, and an end plate 5, which is connected releasably to the housing 4 for the purpose of assembly, though in a leaktight way. The output member 6 (it could also be the input member) is a hollow shaft, into which a shaft that is merely indicated is introduced by means of splines; it is supported in bearings 7 in the front plate 3 and the end plate 5 of the input member 1 and can be sealed off relative to the latter by means of seals 8. Simple sealing rings are sufficient because the rotational-speed difference is very small on average. 9 denotes the axis of rotation or center line.

Within the housing 4, there is a hydrostatic displacement machine 20, which comprises an inner part 21 and an outer part 22. The first of these is connected in a rotationally fixed manner to the output member 6, while the second is connected to the input member 1 and, more specifically, to the housing 4. The corresponding coupling teeth are merely indicated. Extending between the inner part 21 and the outer part 22 is a working space 23, which is supplied via an intake passage 24 in a manner that is not shown. Adjoining the hydrostatic displacement machine 20 on the other side is an insert 25, which contains a pressure passage 26 and a piston 27, which is acted upon by the pressurized fluid supplied via the pressure passage 26 and, with the insert 25, delimits a pressure space 34. Some of this pressurized fluid can be directed into the space, which contains a clutch 31, via a throttle valve 28 by a piston 27, a number of inner plates 29 and outer plates 30 being arranged in said space. The first of these are connected to the output member 6 in a way that prevents relative rotation but allows translation, while the second are connected in the same way to the housing 4 of the input member 1.

For the purpose of mounting a device for compensating the force exerted on the piston 27 by the centrifugal force in the pressure chamber 34, the housing 4 here has a plurality of apertures 10, which are distributed around the circumference and through which two-armed angled levers 12 reach. One leg of such a lever is constructed as a flyweight 11, while the other is constructed as a pressure finger 13, which engages in a recess 14 on the opposite side of the piston 27 from the pressure space 34. Instead of a pivot passing through the two-armed lever 12, a bearing edge 15, on which a bearing shoulder 16 on the rear side of the pressure finger 13 is supported, is provided here on the aperture 10 in the housing 4. This ensures that the lever 12 does not fly off. A projection 18, which is held by an end stop 17 when the outermost permitted position of the flyweight 11 is reached, can be provided on the outermost end of the flyweight 11.

Figure 2:
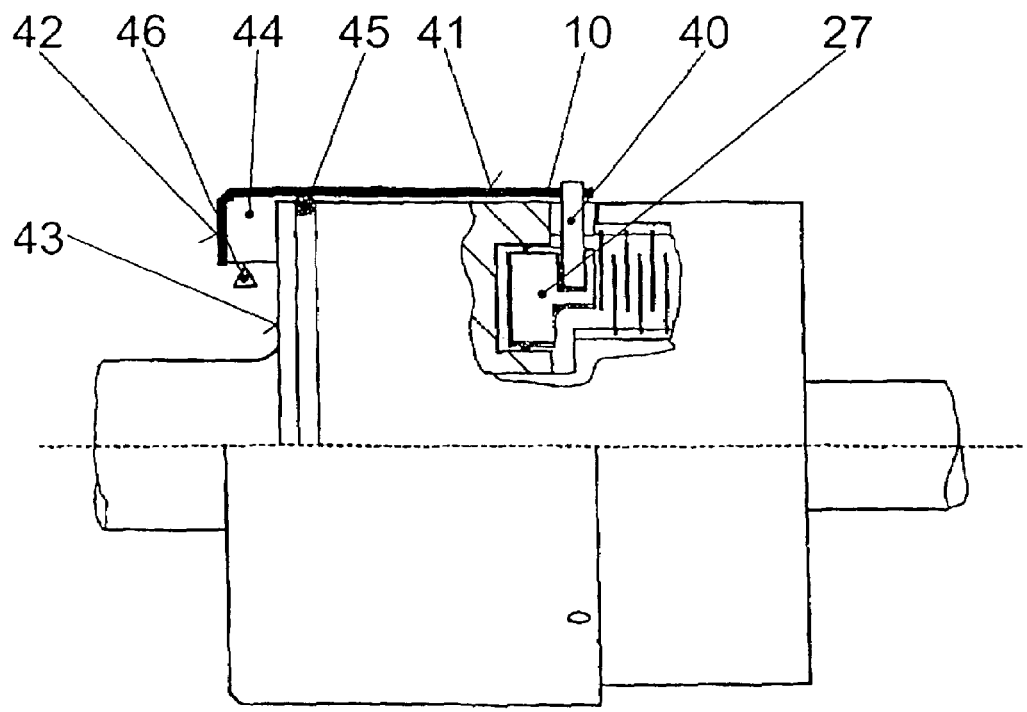
FIG. 2 shows a longitudinal section through a device according to the invention in a second embodiment.

FIG. 2 shows a different design. Here too, the housing 4 has a plurality of apertures 10 distributed around the circumference, through which radial pins 40 inserted into the piston 27 extend outward and are connected to a cylindrical sleeve 41 surrounding the housing 4 all the way round. They can transmit a force in the axial direction between the sleeve 41 and the piston 27. The cylindrical sleeve 41 extends toward the left in the figure, projects beyond the housing 4 and ends in a wall 42 in the form of a circular ring normal to the axis. An annular space 44 is thus formed between this wall and a wall 43, normal to the axis, of the housing 4. This annular space is sealed off by means of a sealing ring 45 between the housing 4 and the sleeve 41 and contains working fluid to a level determined by the inside diameter of the wall 42.

When the housing 4 is rotated, this liquid surface 46 becomes a cylindrical surface. During rotation, the centrifugal force in this annular space 44 gives rise to a pressure that pulls the wall 43 of the sleeve 41 to the left in the exemplary embodiment illustrated and thus, in turn, exerts on the piston 27, via the pins 40, a force that compensates for the centrifugal force in the pressure space 34. The design and position of the annular space 44 can also be modified. The essential point is that an axial force counter to the force acting on the piston 27 in the pressure space 34 arises.

Figure 3:
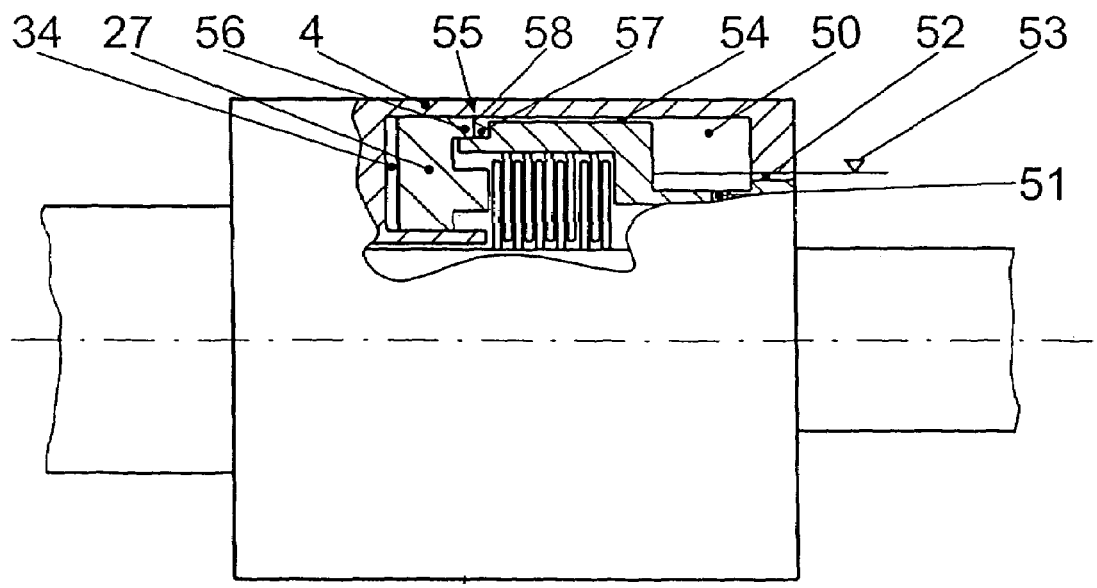
FIG. 3 shows a longitudinal section through a device according to the invention in a third embodiment.

According to the variant in FIG. 3, the connection between the annular space and the piston can also be established hydraulically. For this purpose, an annular space 50 is again provided, on the opposite side of the piston 27 from the pressure space 34 and within the housing 4 in the exemplary embodiment shown. The annular space 50 is kept filled from the interior of the clutch space via a feed hole 51, a drain hole 52 ensuring that a constant (cylindrical) liquid surface 53 is maintained. The pressure produced by the centrifugal force in the annular space 50 acts via an axial passage 54 (or a plurality of such passages) on an annular cylinder 55. This is likewise formed in the housing 4 and accepts an annular continuation 56 of the piston 27 in a sealing manner. With the annular cylinder 55, it forms a compensation pressure space 57. There, the pressure acts on the surface 58 in the form of a circular ring and thus compensates for the action of the pressure prevailing in the pressure chamber 34.

It is possible to modify many details of the exemplary embodiments illustrated while remaining within the scope of the invention. Thus the construction of the hydrostatic displacement machine can vary very widely, both as regards the shape of its rotors and as regards their arrangement in the housing 4. Finally, the power transmission unit can be arranged at various points within the drive train, in particular ahead of or after the axle differential in the power flow. It can also be arranged within a housing containing the axle differential.

The invention claimed is:

1. A hydraulic clutch assembly comprising:
a rotatable housing;
a coupling shaft rotatably supported by said housing;
a piston disposed within said housing, said piston having a first side communicating with a first fluid and a second side;
a clutch cavity defined by said piston, said housing and said coupling shaft;
a friction clutch disposed within said clutch cavity and operable to selectively couple said housing and said coupling shaft; and
a centrifugal mass element disposed outside of said clutch cavity and associated with said piston and said housing;
wherein a first force is imparted on said first side of said piston when said first fluid rotates with said housing and a second force is imparted on said second side of said piston to counter said first force when said mass element moves radially outward as said mass element rotates with said housing.

2. The hydraulic clutch of claim 1, wherein said mass element is a flyweight.

3. The hydraulic clutch of claim 2, wherein said flyweight is pivotally associated with said housing.

4. The hydraulic clutch of claim 3, wherein said mass element includes a first leg and a second leg, said first leg being said flyweight and said second leg communicating with said second face of said piston and imparting said second force on said second face when said mass elements rotates with said housing.

5. The hydraulic clutch of claim 1, wherein said mass element is a second fluid and said hydraulic clutch further comprises an annular cavity containing said second fluid wherein said second force is imparted on said second side of said piston counter to said first force when said second fluid rotates with said housing.

6. The hydraulic clutch of claim 5, wherein said second fluid is the same as said first fluid.

7. The hydraulic clutch of claim 1, further comprising a sleeve slidingly attached to said housing and coupled to said second face of said piston, said sleeve bounding a portion of said annular space wherein said second force is imparted on said second side of said piston to counter said first force when said sleeve translates axially relative to said housing.

8. The hydraulic clutch of claim 7, further comprising a plurality of pins coupling said piston and said sleeve.

9. The hydraulic clutch of claim 1, wherein said annular cavity further includes a second annular cavity and an annular continuation connecting said first and second annular cavities.

10. A hydraulic clutch assembly comprising:
a rotatable housing;
a coupling shaft rotatably supported by said housing;
a piston disposed within said housing, said piston having a first side communicating with a first fluid and a second side;
a friction clutch disposed within said housing and operable to selectively couple said housing and said coupling shaft;
a centrifugal mass element associated with said second side of said piston and said housing;
wherein a first force is imparted on said first side of said piston when said first fluid rotates with said housing and a second force is imparted on said second side of said piston to counter said first force when said mass element moves radially outward as said mass element rotates with said housing,
wherein said mass element is a second fluid and the hydraulic clutch further comprises an annular cavity containing said second fluid wherein said second force is imparted on said second side of said piston counter to said first force when said second fluid rotates with said housing; and
a sleeve slidingly attached to said housing and coupled to said second side of said piston, said sleeve bounding a portion of said annular cavity wherein said second force is imparted on said second side of said piston to counter said first force when said sleeve translates axially relative to said housing.

11. The hydraulic clutch of claim 10, wherein said mass element is a flyweight.

12. The hydraulic clutch of claim 11, wherein said flyweight is pivotally associated with said housing.

13. The hydraulic clutch of claim 12, wherein said mass element includes a first leg and a second leg, said first leg being said flyweight and said second leg communicating with said second face of said piston and imparting said second force on said second face when said mass elements rotates with said housing.

14. The hydraulic clutch of claim 10, wherein said second fluid is the same as said first fluid.

15. The hydraulic clutch of claim 10, further comprising a plurality of pins coupling said piston and said sleeve.

16. The hydraulic clutch of claim 10, wherein said annular cavity includes a second annular cavity and an annular continuation connecting said first and second annular cavities.

17. A power transmission comprising:
a first rotatable shaft;
a second rotatable shaft; and
a hydraulic clutch assembly coupling said first and second shafts, said hydraulic clutch assembly including:
a housing containing a first fluid and coupled to said first shaft;
a coupling shaft rotatably supported by said housing and coupled to said second shaft;
a piston disposed within said housing, said piston having a first side communicating with said first fluid and a second side;
a friction clutch disposed within said housing operable to selectively and rotatably couple said housing and said coupling shaft; and
a centrifugal mass element associated with said second side of said piston and said housing;
wherein a first force is imparted on said first side of said piston when said first fluid rotates with said housing and a second force is imparted on said second side of said piston to counter said first force when said mass element moves radially outward as said mass element rotates with said housing;
wherein said mass element is a second fluid and said hydraulic clutch assembly further comprises an annular cavity containing said second fluid wherein said second force is imparted on said second side of said piston counter to said first force when said second fluid rotates with said housing; and
a sleeve slidingly attached to said housing and coupled to said second side of said piston, said sleeve bounding a portion of said annular cavity wherein said second force is imparted on said second side of said piston to counter said first force when said sleeve translates axially relative to said housing.

18. The power transmission of claim 17, wherein said mass element is a flyweight.

19. The power transmission of claim 18, wherein said flyweight is pivotally associated with said housing.

20. The power transmission of claim 19, wherein said mass element includes a first leg and a second leg, said first leg being said flyweight and said second leg communicating with said second face of said piston and imparting said second force on said second face when said mass elements rotates with said housing.

21. The power transmission of claim 17, wherein said friction clutch includes a first plurality of disks coupled to said housing and a second plurality of disks coupled to said shaft.

22. The power transmission of claim 17, wherein said second fluid is the same as said first fluid.

23. The power transmission of claim 17, further comprising a plurality of pins coupling said piston and said sleeve.

24. The power transmission of claim 17, wherein said annular cavity includes a second annular cavity and an annular continuation connecting said first and second annular cavities.

25. The power transmission of claim 17, wherein said second force is greater than said first force.

26. A power transmission comprising:
a first rotatable shaft;
a second rotatable shaft; and
a hydraulic clutch assembly coupling said first and second shafts, said hydraulic clutch assembly including:
a housing containing a first fluid and coupled to said first shaft;
a coupling shaft rotatably supported by said housing and coupled to said second shaft;
a piston disposed within said housing, said piston having a first side communicating with said first fluid and a second side;

a clutch cavity defined by said piston, said housing and said coupling shaft;

a friction clutch disposed within said clutch cavity and operable to selectively couple said housing and said coupling shaft; and a centrifugal mass element disposed outside said clutch cavity and associated with said piston and said housing;

wherein a first force is imparted on said first side of said piston when said first fluid rotates with said housing and a second force is imparted on said second side of said piston to counter said first force when said mass element moves radially outward as said mass element rotates with said housing.

27. The power transmission of claim 26, wherein said mass element is a flyweight.

28. The power transmission of claim 27, wherein said flyweight is pivotally associated with said housing.

29. The power transmission of claim 28, wherein said mass element includes a first leg and a second leg, said first leg being said flyweight and said second leg communicating with said second face of said piston and imparting said second force on said second face when said mass elements rotates with said housing.

30. The power transmission of claim 26, wherein said friction clutch includes a first plurality of disks coupled to said housing and a second plurality of disks coupled to said shaft.

31. The power transmission of claim 26, wherein said second force is greater than said first force.

* * * * *